UNITED STATES PATENT OFFICE.

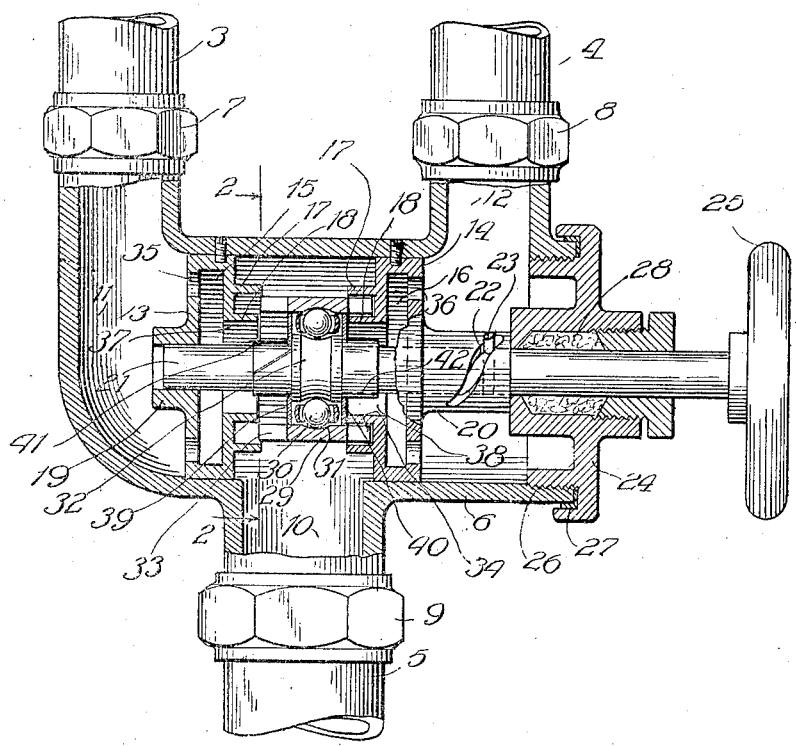
W. F. KNOX.
MIXING FAUCET.
APPLICATION FILED APR. 19, 1917. RENEWED APR. 5, 1920.
1,345,934.   Patented July 6, 1920.

WALTER F. KNOX, OF PORT HURON, MICHIGAN.

MIXING-FAUCET.

1,345,934.     Specification of Letters Patent.     Patented July 6, 1920.

Application filed April 19, 1917, Serial No. 163,113. Renewed April 5, 1920. Serial No. 371,481.

*To all whom it may concern:*

Be it known that I, WALTER F. KNOX, a citizen of the United States, residing at Port Huron, in the county of St. Clair and State of Michigan, have invented certain new and useful Improvements in Mixing-Faucets, of which the following is a specification.

My invention relates more particularly to mixing faucets for bath tubs, showers and the like, in which it is desirable to regulate the temperature of the mixture of hot and cold water to a nicety. In such mixing devices so far as known to me, objection has always been encountered that the pressure upon the hot and cold water supply pipes fluctuates because of the opening of faucets in other parts of the water supply system, or from other causes. The result is that instead of an even, steady mixture of uniform temperature, the water flowing from the faucet varies within wide temperature limits according as the pressure on the hot or the cold water becomes for the moment excessive. It is the object of my invention to obviate this fluctuation in temperature and produce a mixture which is comparatively uniform notwithstanding any variations which may occur in the pressures of the hot and cold water respectively. With this purpose in view I provide a device which may be considered as a reversible motor-pump, which is driven by the cold or hot water flow, according to which is for the moment under greater pressure, and pumps or accelerates the flow of the water which is under the lesser pressure at the time.

In the accompanying drawings I have shown and in the following specification described in detail a preferred form of my invention. It is to be understood, however, that the specific disclosure is for the purpose of exemplification only and that the scope of the invention is defined in the following claims in which I have endeavored to distinguish it from the prior art so far as known to me without, however, relinquishing or abandoning any portion or feature thereof.

Referring to the drawings Figure 1 is a side elevation partly in section of a preferred form of my invention, and Fig. 2 a transverse section upon the line 2—2 of Fig. 1.

The supply pipes for the device are shown at 3 and 4 respectively, and the exhaust pipe at 5. These pipes may have in addition to my improved mixing faucet the valves regularly or usually employed for controlling the flow of the water in systems of this character. The improved mixing faucet comprises a casting 6 which is tubular in form and provided with connections 7, 8, and 9, for the respective pipes. The outlet connection is as shown located intermediate the inlet connections and communicating with a central discharge chamber 10 which is separated from the respective inlet chambers 11, 12 by diaphragm castings 13, 14. Said diaphragm castings are hollowed or chambered at 15, 16 and formed with concentric annular flanges 17, 18 for a purpose which will appear. The casting 13 is formed with a perforated boss 19 and casting 14, formed with a somewhat similar but elongated boss or sleeve 20, in which bosses is mounted a shaft 21 adapted for partial rotation and longitudinal motion therein. The sleeve 20 is formed with a spiral slot 22 which receives a pin 23 on said shaft, and the latter extends through a cap 24 to the outside of the casting where it is formed with a handle 25. Obviously by turning this handle and the shaft, and in consequence of the engagement of the pin 23 with the slot 22, the shaft may be longitudinally reciprocated for a purpose which will presently appear. The cap 24 is threaded into the casting at 26, suitably packed at 27 and formed with a gland or packing chamber 28 about the shaft to avoid leakage.

A sleeve 29 is journaled upon the shaft 21 for rotation with respect thereto by means of a roller bearing 30 interposed between a grooved ball race 31 on said sleeve and a grooved race 32 formed upon said shaft. Because of this construction the sleeve is revoluble independently of the shaft but moves longitudinally therewith, and is formed at its respective ends with series of spiral vanes 33, 34 inclined in the same direction. The diaphragm castings 13, 14 are each formed with an annular series of openings 35, 36, communicating with the chambers 15, 16, respectively, and the latter communicate through central openings 37, 38 with the interior of the revoluble sleeve above described. The flow of water, therefore, is through the diaphragms and into the interior of the sleeve whence it flows between the inclined vanes to the discharge chamber 10 about or around the sleeve. The relative proportions of hot and cold water are regulated by adjusting the shaft, and consequently the sleeve longitudinally to cover more or less of the water passages between the vanes by the respective flanges 17, 18. On opposite sides of the roller bearing are mounted washers 39, 40 maintained in position by friction sleeves 41, 42 upon the spindle or shaft 21 for preventing the flow of liquid from one end of said sleeve to the other.

In use the hand wheel 25 is set to adjust the sleeve axially thereof to proportion the flow of hot and cold water to produce the mean temperature desired. When the stop cock controlling the flow is opened and as long as the pressure upon the hot and cold water respectively remains relatively the same, the temperature of the mixture will be unaltered. When for any reason the pressure of either the hot or cold water varies with respect to the other, the water of higher pressure tends to rotate the sleeve more rapidly than the water of lower pressure so that the sleeve forms a drag or check upon the water of higher pressure, by reason of the resistance of its blades or vanes upon the corresponding end thereof, while it operates as a pump relative to the water of lower pressure because of the action of the vanes thereon to accelerate the flow. Thus the sleeve with its vanes acts to equalize the flow of the two liquids or more properly speaking, to render the flow proportional to the area of the openings between the blades uncovered by the respective flanges 17, 18. By this action the objectionable variations in temperature of the mixture flowing out of the faucet are reduced to a minimum. I have described the invention with reference to hot and cold water, but evidently it is applicable to the mixture of other fluids and whatever the purpose for which it is employed certain changes which will suggest themselves to the mechanic skilled in this art can be made without departing from my invention.

I claim:

1. In a device of the class described, a casing, a pair of inlets for fluids to be mixed, an outlet, a rotary element intermediate the respective inlets and the outlet and driven by the flow of fluid adapted to accelerate the flow of the more slowly moving fluid and to retard the flow of the more rapidly moving fluid.

2. In a device of the class described, a casing having a pair of inlets and an outlet, a rotary member intermediate the respective inlets and outlet having two sets of vanes extending respectively into the path of flow from each inlet and tending to regulate the flow from the respective inlets.

3. In a device of the class described, a casing comprising a pair of inlets and an outlet, a rotary member having two series of vanes projecting into the path of flow from the respective inlets, means coöperating with the vanes of each series to control the flow of liquid therethrough and means for adjusting the rotary member relative to said means to proportion the flow of fluid through the respective series of vanes.

4. In a device of the class described, a housing, means dividing said housing into a pair of inlet chambers and an outlet chamber, said means having passages therethrough for the flow of liquid from the respective inlets to the outlet chamber, and a rotary element arranged in the outlet chamber and having two sets of vanes projecting respectively into the paths of flow from the inlet chambers.

5. In a device of the class described, a housing having a pair of inlet chambers and an intermediate outlet chamber, diaphragms separating the respective inlet chambers from the outlet chamber and having passages therethrough, a rotary element mounted in the outlet chamber and having vanes on its respective ends adjacent the respective diaphragms and projecting into the path of fluid from the respective inlet chambers, means on the respective diaphragms for cutting off the flow through the corresponding series of vanes and means for adjusting the rotary member axially.

6. In a device of the class described, a housing having a pair of inlet chambers and an intermediate outlet chamber, perforated diaphragms separating the respective inlet chambers from the outlet chamber, annular coaxial flanges projecting from the respective diaphragms into the outlet chamber, a rotary member having series of vanes projecting into the respective annular flanges and coöperating therewith to control the flow of liquid and means for axially adjusting the rotary member with respect to said flanges to proportion the flow of liquids from the inlet chambers.

7. In a device of the class described, a housing having a pair of inlet chambers and an intermediate outlet chamber, perforated diaphragms separating the respective inlet chambers from the outlet chamber, said diaphragms having coaxial annular flanges extending into the outlet chamber, a rotary sleeve coaxial with said flanges and having a series of inclined vanes at each end thereof, said vanes coacting with the respective flanges to control the flow of liquid therethrough and means to adjust the sleeve axially with respect to the flanges to proportion the flow of liquids therethrough.

8. In a device of the class described, a housing comprising a pair of inlet chambers and an intermediate outlet chamber, perforated diaphragms separating said chambers, annular coaxial flanges extending from said diaphragms into the outlet chamber, a revoluble sleeve having series of inclined vanes on its respective ends projecting into and coöperating with the corresponding flanges for controlling the flow of liquid therethrough, an axially adjustable spindle extending concentrically of said sleeve and connections between said spindle and sleeve permitting relative rotary motion thereof but maintaining the axial relations of said parts.

9. In a device of the class described, a housing having a pair of inlet chambers and an intermediate outlet chamber, diaphragm castings separating said inlet chambers from said outlet chamber, each of said castings being perforated for the passage of fluid therethrough and formed with an annular flange projecting into the outlet chamber, said flanges being coaxial, an axially adjustable sleeve arranged between said diaphragms in the outlet chamber and having a series of inclined vanes on each end coöperating with the corresponding annular flange to control the flow of water therethrough, a spindle mounted for the axial adjustment in said diaphragms and roller connections between said spindle and said sleeve whereby independent rotary movement is permitted but the sleeve may be axially adjusted by means of said spindle.

10. In a device of the class described, a housing having a pair of inlet chambers and an intermediate outlet chamber therein, a pair of diaphragm castings separating said inlet chambers from the outlet chamber, each casting being provided with openings for the flow of liquid therethrough and an annular flange, said flanges being coaxial, a rotary axially adjustable sleeve intermediate said diaphragms within the outlet chamber and having series of vanes on its respective ends coöperating with the corresponding flanges for controlling the flow of fluid therethrough, a spindle coaxial with said sleeve and reciprocably mounted in said diaphragms, a sleeve surrounding said spindle, an inclined slot in said sleeve, a pin on said spindle engaging said slot, a handle for rotating said spindle and a rotary connection between said spindle and sleeve whereby the adjustment of the spindle adjusts the sleeve.

WALTER F. KNOX.